United States Patent [19]

Nakanishi et al.

[11] Patent Number: 5,259,822
[45] Date of Patent: Nov. 9, 1993

[54] RUBBER ARTICLE REINFORCED WITH FIBERS EMBEDDED THEREIN

[75] Inventors: Yasuyuki Nakanishi; Toru Kusakabe, both of Kobe, Japan

[73] Assignee: Bando Chemical Industries, Ltd., Kobe, Japan

[21] Appl. No.: 656,825

[22] Filed: Feb. 19, 1991

[30] Foreign Application Priority Data

Feb. 19, 1990 [JP] Japan .................. 2-39224

[51] Int. Cl.⁵ .............................................. F16G 5/00
[52] U.S. Cl. ..................................... 474/263; 474/205
[58] Field of Search ............... 474/204, 205, 263, 264, 474/268, 266, 260, 261, 262; 57/902, 210, 232, 234, 237

[56] References Cited

U.S. PATENT DOCUMENTS

| | | | |
|---|---|---|---|
| 2,430,500 | 11/1947 | Freedlander | 474/268 |
| 2,739,090 | 3/1956 | Waugh | 57/902 |
| 2,792,319 | 5/1957 | Fihe | 474/263 |
| 3,992,959 | 11/1976 | Cicognani | 474/268 |
| 4,044,540 | 8/1977 | Toki | 57/902 |
| 4,083,260 | 4/1978 | Carlson | 474/263 |
| 4,457,743 | 7/1984 | Robecchi | 474/268 |
| 4,652,252 | 3/1987 | Westhoff | 57/237 |

FOREIGN PATENT DOCUMENTS

| | | |
|---|---|---|
| 244606 | 4/1987 | German Democratic Rep. ............ 474/263 |
| 60-172041 | 11/1985 | Japan . |
| 61-75855 | 4/1986 | Japan . |

*Primary Examiner*—Peter M. Cuomo
*Assistant Examiner*—Flemming Saether
*Attorney, Agent, or Firm*—Wenderoth, Lind & Ponack

[57] ABSTRACT

A rubber having a fiber reinforcement embedded thereon. The reinforcement comprises a cylindrically braided cords by more than four and even numbered yarns and a center cord provided in a hollow part of it. The twist multiplier K is set lesser than 350, the twist multiplier K being expressed $$K = T\sqrt{D}$$

where T is a number of twists per 10 cm and D is a total denier.

10 Claims, 3 Drawing Sheets

RUBBER ARTICLE REINFORCED WITH FIBERS EMBEDDED THEREIN

BACKGROUND OF THE INVENTION

The present invention relates to a fiber reinforced rubber, particularly, a reinforcement embedded in a rubber.

Since high plessley, high elasticity, high dimensional stability, and high adhesive strength has been required for rubbers such as a belt, a tire, and a hose, a reinforcing cord constructed by fibers or a reinforcing canvas is embedded in a rubber. Generally, a cord of twisted yarns is used for the reinforcement. The yarn may be all twisted, only half of them twisted, or lang lay. The yarns, all of them twisted, are most popular for reinforcement for a rubber.

However, in a rubber reinforced by a twisted yarn, for example, an industrial belt such as a transmission belt and a conveyor belt, maintainability of plessley and maintainability of modulus of elasticity are lowered due to a twisted yarn twisted many times. This shows that maintainability of plessley and maintainability of modulus of elasticity decrease after a certain number of twists.

A rubber reinforced by nontwisted yarn has been known to solve the above problems (maintainability of plessley and maintainability of modulus of elasticity). Although maintainability of plessley and maintainability of modulus of elasticity decrease when the number of twists of a yarn is large, high maintainability of plessley and maintainability of modulus of elasticity can be obtained when the number of twists of a yarn is small, so to speak less twisted. Therefore, a yarn loosely twisted at the optimum maintainability of plessley and maintainability of modulus of elasticity is considered suitable for a rubber.

However, since a rubber reinforced by nontwisted yarn or less twisted yarn possesses disadvantages such as poor dimensional stability and its section is easily deformed to an external stress, destruction of filament is easily caused at a contacting surface to the reinforcement.

A braided cord has been made for various purposes. Since the dimensional stability is especially high due to its structural characteristics in the cylindrically braided cord, more than four and even numbered cords are braided to form a hollow part, the dimensional stability of a rubber is improved and maintainability of plessley and maintainability of modulus of elasticity of a reinforcement are also kept high if a cylindrically braided cord is used for a reinforcement of a rubber.

SUMMARY OF THE INVENTION

The object of the present invention is to improve the dimensional stability of a rubber, besides improvement of maintainability of plessley and maintainability of modulus of elasticity, by providing a nontwisted yarn or less twisted yarn in a center hollow part of a cylindrically braided cord.

In order to achieve the above object, a reinforcement embedded in a rubber is constructed by a cylindrically braided cord, which is braided in a cylindrical configuration by more than four and even numbered yarns, and a center cord provided inside the hollow. Also, the twist multiplier is set less than 350. The twist multiplier K is obtained by the following equation where T is the number of twists per 10 cm and D is the total denier $$K = T\sqrt{D}$$

DESCRIPTION OF THE PREFERRED EMBODIMENT

Preferred embodiment will be described below with reference to accompanying drawings.

Figure 3:
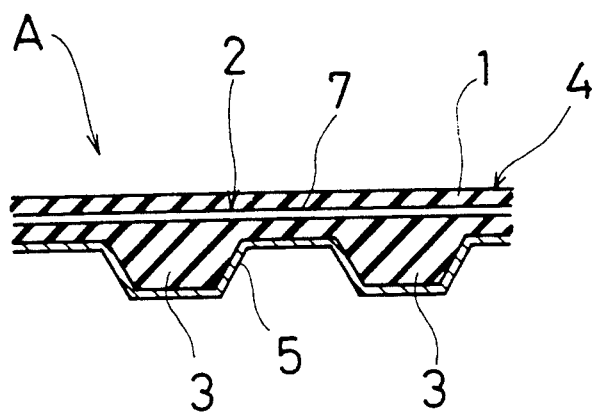
FIG. 3 is an enlarged vertical front section of a toothed belt.

FIG. 3 illustrates a toothed belt A as a fiber reinforced rubber. The toothed belt A comprises a belt base 4 having an stretching rubber ply 1 and a plurality of teeth 3 formed over one side thereon (underside of the belt base in FIG. 3) and made of the same material, a rubber, as the stretching rubber ply 1 (only two teeth are shown in FIG. 3). A fiber reinforcement 2 is embedded on the stretching rubber ply 1 of the belt base 4. A canvas layer 5 is adhered to a surface of teeth 3 of the belt base 4.

Figure 1:
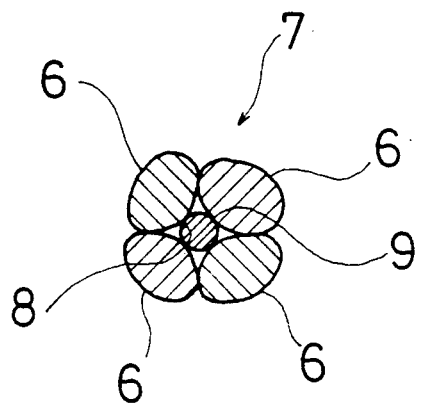
FIG. 1 is an enlarged vertical side section of a cylindrically braided cord.
Figure 2:
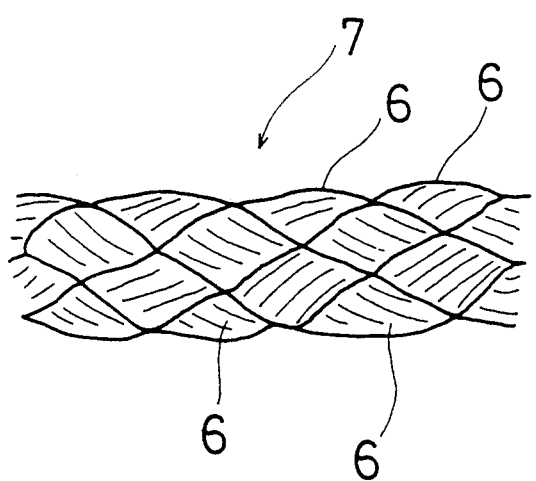
FIG. 2 is an enlarged vertical front section of a cylindrically braided cord.

The reinforcement 2, as enlargely shown in FIGS. 1 and 2, is constructed by both cylindrically braided cords 7 of more than four and even numbered yarns 6 (four yarns in the present embodiment) having a hollow part 8 and a center cord 9 provided inside a hollow part 8 of the cylindrically braided cord 7. The present invention is characterized in that the center cord 9 is constructed by nontwisted yarn or loosely twisted yarn having the twist multiplier K lesser than 350, the twist multiplier K being expressed by the following equation where T is the number of twists per 10 cm and D is the total denier $$K = T\sqrt{D}$$

The yarn 6 may be an inorganic fiber, an organic fiber, or a metallic fiber. Further, a spun yarn of a short or long staple fiber or combination of those can be used for the yarn 6 depending on the required performance of the toothed belt A. A long staple fiber having high plessley and modulus of elasticity is preferred. When a combination yarn is used for the yarn 6, at least one of the yarn needs to be high plessley and high modulus of elasticity.

Also, the number of yarns 6 forming a cylindrically braided cord 7 can be any even numbers if it is more than 4. In order to make a cord of cylindrical configuration, more than four and even numbered yarns are required. A symmetric hollow part 8 cannot be formed with the odd numbered yarns. Also, the total denier of the yarn 6 and the denier of the monofilament are selected according to the required performance of the toothed belt A. The center cord 9 is composed of the same or different fibers of the above yarn 6 depending on the usage and object of the cord.

Figure 4:
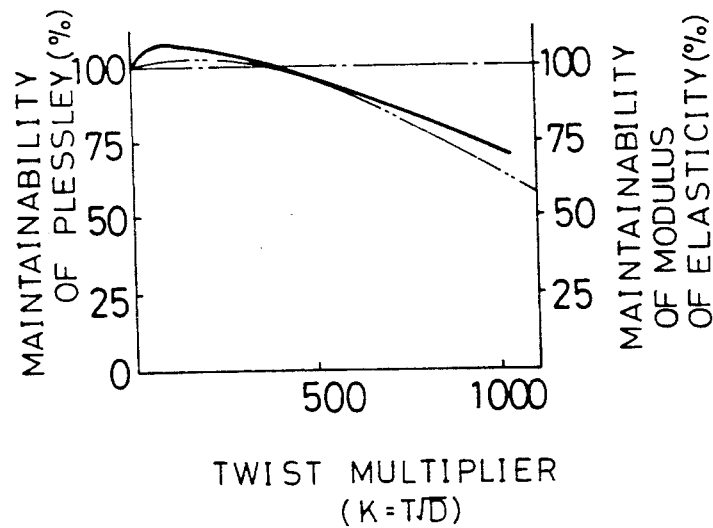
FIG. 4 is a map showing a relation between a twist multiplier and maintainability of plessley and maintainability of modulus elasticity.

Since both maintainability of plessley and maintainability of modulus of elasticity are high wherein K=1~350, as shown in data in FIG. 4, the twist multiplier K is set lesser than 350, the twist multiplier K being expressed by the following equation where T is the number of twists per 10 cm and D is the total denier $$K = T\sqrt{D}$$

The twisting direction of the center cord 9 and the twisting method (all yarns are twisted, half of yarns are twisted, or lang lay) is not limited to specific types.

The cylindrically braided cord 7 go through adhesive process, which the cord is soaked into adhesive combined with epoxy resin, isocyanate compound, ethylene urea compound, and resorcin formalin latex (RFL), etc. and stretching process before it is embedded in the stretching rubber ply 1. Dipping process is preferable for the adhesive process in order to soak adhesive evenly from surface to inside of it.

The result of an elongation test is carried out, comparing the above constructed toothed belt A with a comparable example.

Construction of Toothed Belt A According to the Present Invention

Four 330 de of nylon fibers are used for the cylindrically braided cord 7, having three simply arranged 1500 de (the number of total denier is 4500 de) Kevlar (product of DuPont) composed of aramid fibers used for a center cord 9 constructing a reinforcement 2.

The cylindrically braided cord 7 is dipped into the isoayanate compound so as to form a sub-coat ply, then it is dipped into the adhesive combination liquid of resorcin formalin latex (RFL) so as to form a second-coat ply; further, it is dipped into chloroprene rubber so as to form a top-coat ply, and finally a stretching process is carried out with 1 g/de tension. The toothed belt A wherein the reinforcement 2 composed of a plurality of the cylindrically braided cords 7 having center cords 9 provided in the center hollow parts 8 are embedded on the belt base 4 is obtained in the following steps: a plurality of cylindrically braided cords 7 finished the stretching process is put spirally on the stretching rubber ply 1 of the chloroprene rubber, and the teeth 3 of the chloroprene rubber is formed on it so that the cylindrically braided cord 7 is embedded thereon, thereafter, the nylon cloth 5 is adhered to the surface of teeth 3 and the rubber is cured. The adhesive is soaked evenly from the surface to the inside of the cylindrically braided yarn 7 during the adhesive process.

Toothed Belt of Comparable Example

Three 1500 de (total denier is 4500) Kevlar (product of DuPont) of aramid fibers are used for the center cord 9. Other features are the same as the belt of the present invention.

Test on Elongation

Figure 5:
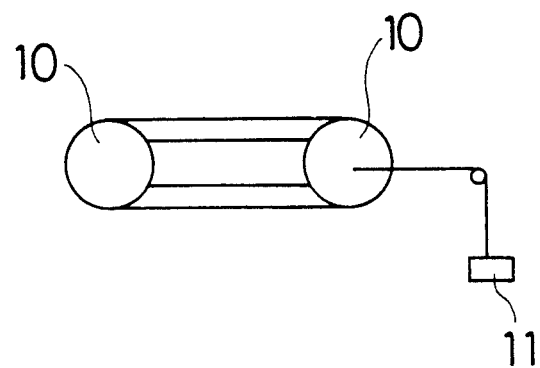
FIG. 5 is an explanatory drawing of the testing system for an elongation.

The test was carried out by the system shown in FIG. 5, where the toothed belt A is wound around two pulleys (50 mm in diameter) and a predetermined tension is applied to the toothed belt A by a weight 11.

Figure 6:
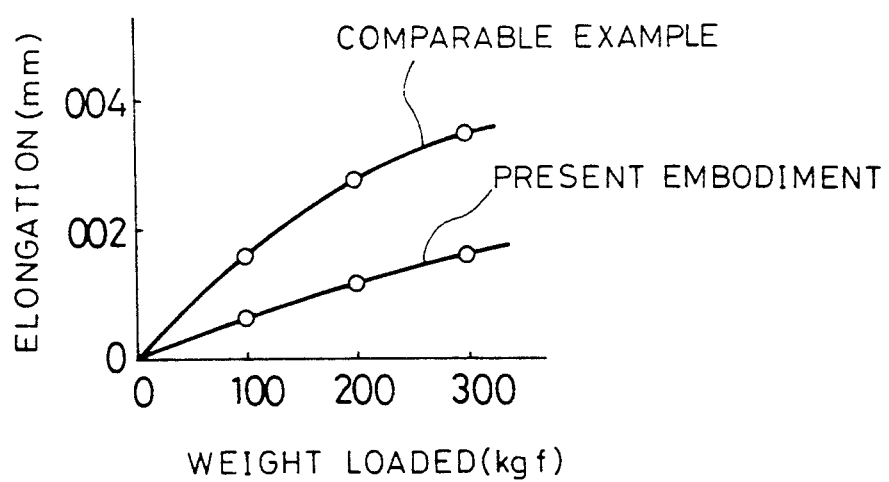
FIG. 6 is a map showing a relation between a weight loaded and elongation of a belt.

The test data is shown in FIG. 6. From this test data, the elongation of the present invention is 0.015 mm and the elongation of the comparable example is 0.035 mm wherein the load 300 kgf is applied, which is more than double of the present invention. This shows that the present embodiment is superior in the dimensional stability. The difference results from that the center cord 9 provided in the hollow part 8 of the cylindrically braided cord 7 is composed of three simply arranged yarns, although the center cord 9 is composed of three yarns, all twisted yarns.

As shown above, in the present invention, the reinforcement 2 embedded in the belt body 4 is constructed by providing the center cord 9 having the twist multiplier K lesser than 350 in the hollow part 8 of the cylindrically braided cord 7 braided by more than four and even numbered yarns 6. The twist multiplier being expressed by the equation $$K = T\sqrt{D}$$

where K is the twist multiplier, T is the number of twists per 10 cm, and D is the total denier. The twisting characteristic of the center cord 9 improves maintainability of plessley and maintainability of modulus of elasticity. Also, the structural characteristic of the cylindrically braided cord 7 covers the deforms of a twisted yarn to the external stress and improves the dimensional stability of the toothed belt A.

In the present embodiment, the flex rigidity of the toothed belt A (the cylindrically braided cord 7) is regulated by selecting the material and thickness of the center cord 9 according to the object and the usage.

Moreover, in the present embodiment, the toothed belt A is shown for a rubber. However, the belt is not limited to the toothed belt A, but covers an industrial belt such as a conveyor belt and a transmission belt like a flat belt and a ribbed belt. The present invention also can be applied to rubbers other than belts, for example, to tires and hoses.

What is claimed is:

1. A fiber reinforced rubber having a fiber reinforcement embedded thereon, said reinforcement comprising a center cord having a twist multiplier K less than 350, said twist multiplier being expressed by the equation $$K = T\sqrt{D}$$

where K is the twist multiplier, T is the number of twists per 10 cm, and D is the total denier; and a cylindrically braided cord braided around said center cord, such that the center cord fills a center of said cylindrically braided cord.

2. A fiber reinforced rubber claimed as claim 1, wherein said cylindrically braided cord is composed of yarns of inorganic fibers.

3. A fiber reinforced rubber claimed as claim 1, wherein said cylindrically braided cord is composed of yarns of organic fibers.

4. A fiber reinforced rubber claimed as claim 3, wherein said organic fibers of said yarns is aramid fibers.

5. A fiber reinforced rubber claimed as claim 1, wherein said cylindrically braided cord is composed of yarns of metallic fibers.

6. A fiber reinforced rubber claimed as claim 1, wherein said cylindrically braided cord is composed of long fiber spun yarns.

7. A fiber reinforced rubber claimed as claim 1, wherein said cylindrically braided cord is composed of short fiber spun yarns.

8. A fiber reinforced rubber claimed as claim 1, which is a transmission belt.

9. A fiber reinforced rubber claimed as claim 8, which said transmission belt is a toothed belt wherein a belt base comprises a stretching rubber ply and a plurality of teeth composed of the same material as said stretching rubber ply and formed one side on said belt base, a fiber reinforcement embedded in said stretching rubber ply.

10. A fiber reinforced rubber claimed as claim 1, wherein said cylindrically braided cord is braided by four or more even numbered yarns.

* * * * *